(12) United States Patent
Nakao et al.

(10) Patent No.: US 11,030,418 B2
(45) Date of Patent: Jun. 8, 2021

(54) TRANSLATION DEVICE AND SYSTEM WITH UTTERANCE REINPUT REQUEST NOTIFICATION

(71) Applicant: Panasonic Intellectual Property Management Co., Ltd., Osaka (JP)

(72) Inventors: Taketoshi Nakao, Kyoto (JP); Ryo Ishida, Osaka (JP); Takahiro Kamai, Kyoto (JP); Tetsuji Mochida, Osaka (JP); Mikio Morioka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 150 days.

(21) Appl. No.: 16/278,702

(22) Filed: Feb. 18, 2019

(65) Prior Publication Data

US 2019/0179908 A1 Jun. 13, 2019

Related U.S. Application Data

(63) Continuation of application No. PCT/JP2017/030650, filed on Aug. 28, 2017.

(30) Foreign Application Priority Data

Sep. 23, 2016 (JP) .............................. JP2016-185236

(51) Int. Cl.
*G06F 40/42* (2020.01)
*G10L 25/72* (2013.01)
(Continued)

(52) U.S. Cl.
CPC ................ *G06F 40/42* (2020.01); *G06F 3/16* (2013.01); *G06F 40/194* (2020.01);
(Continued)

(58) Field of Classification Search
CPC ....................... G06F 40/40–58; G06F 16/3337
(Continued)

(56) References Cited

U.S. PATENT DOCUMENTS

| 6,393,389 | B1* | 5/2002 | Chanod | ................. | G06F 40/289 |
| | | | | | 704/7 |
| 8,010,474 | B1* | 8/2011 | Bill | ....................... | A63F 13/825 |
| | | | | | 706/46 |

(Continued)

FOREIGN PATENT DOCUMENTS

| JP | 1-205272 | 8/1989 |
| JP | 4-319769 | 11/1992 |

(Continued)

OTHER PUBLICATIONS

International Search Report of PCT application No. PCT/JP2017/030650 dated Oct. 10, 2017.

*Primary Examiner* — Jesse S Pullias
(74) *Attorney, Agent, or Firm* — McDermott Will and Emery LLP

(57) ABSTRACT

A translation device is configured to acquire utterance spoken by a speaker in a first language and translate contents of the utterance into a second language for information presentation, and includes an input unit, a controller, a notification unit, and a storage. The input unit acquires the utterance in the first language and generates voice data from the utterance. The controller acquires a first evaluation value. The notification unit presents the speaker with information on utterance reinput request. The notification unit presents first information on utterance reinput request when the first evaluation value is less than or equal to a first predetermined value. The controller generates new voice recognition data with reference to the past voice recognition data and voice recognition data of reinput utterance, when (Continued)

the voice recognition data of the reinput utterance has an evaluation value less than or equal to a predetermined value.

14 Claims, 16 Drawing Sheets

(51) Int. Cl.
- *G10L 15/22* (2006.01)
- *G10L 15/00* (2013.01)
- *G06F 3/16* (2006.01)
- *G06F 40/51* (2020.01)
- *G06F 40/58* (2020.01)
- *G06F 40/194* (2020.01)
- *G06F 40/216* (2020.01)
- *G06F 40/279* (2020.01)

(52) U.S. Cl.
CPC .......... *G06F 40/216* (2020.01); *G06F 40/279* (2020.01); *G06F 40/51* (2020.01); *G06F 40/58* (2020.01); *G10L 15/00* (2013.01); *G10L 15/22* (2013.01); *G10L 25/72* (2013.01); *G10L 2015/225* (2013.01)

(58) Field of Classification Search
USPC .......................................... 704/2–8
See application file for complete search history.

(56) References Cited

U.S. PATENT DOCUMENTS

| | | | |
|---|---|---|---|
| 2001/0003826 A1* | 6/2001 | Iwata | H04L 51/063 709/206 |
| 2002/0032561 A1 | 3/2002 | Ishikawa et al. | |
| 2005/0288919 A1* | 12/2005 | Wang | G06F 40/55 704/2 |
| 2007/0061152 A1* | 3/2007 | Doi | G06F 40/58 704/277 |
| 2008/0091407 A1 | 4/2008 | Furihata et al. | |
| 2008/0133245 A1* | 6/2008 | Proulx | G06F 40/55 704/277 |
| 2011/0202518 A1* | 8/2011 | Maedera | G06F 40/47 707/706 |
| 2013/0103381 A1* | 4/2013 | Assche | G06F 40/47 704/2 |
| 2015/0134320 A1* | 5/2015 | Rangarajan Sridhar | G10L 15/005 704/2 |
| 2016/0042053 A1 | 2/2016 | De Sousa Webber | |

FOREIGN PATENT DOCUMENTS

| | | |
|---|---|---|
| JP | 2002-082947 | 3/2002 |
| JP | 2005-157166 | 6/2005 |
| JP | 2008-083459 | 4/2008 |
| WO | 2013/014877 | 1/2013 |
| WO | 2016/020368 | 2/2016 |

* cited by examiner

FIG. 4

| EVALUATION VALUE FOR VOICE RECOGNITION | EVALUATION VALUE FOR TRANSLATION | EVALUATION VALUE FOR REVERSE TRANSLATION | CONTENTS OF MESSAGE |
|---|---|---|---|
| LOW | - | - | PLEASE SPEAK CLEARLY AGAIN |
| HIGH | LOW | - | PLEASE SPEAK AGAIN IN DIFFERENT EXPRESSION |
| HIGH | HIGH | LOW | PLEASE CHECK WHETHER OR NOT YOUR PARTNER RECEIVES WHAT YOU WANT TO TELL |
| HIGH | HIGH | HIGH | (NO MESSAGE PRESENTED) |

FIG. 8
■ EXAMPLE OF USING PAST DATA
 (VOICE RECOGNITION) UPON RE-UTTERANCE
(A) FIRST VOICE RECOGNITION
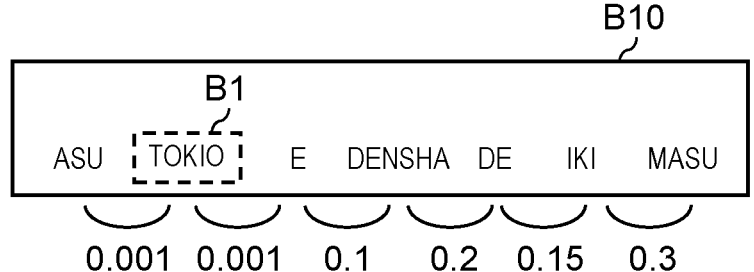
(B) SECOND VOICE RECOGNITION
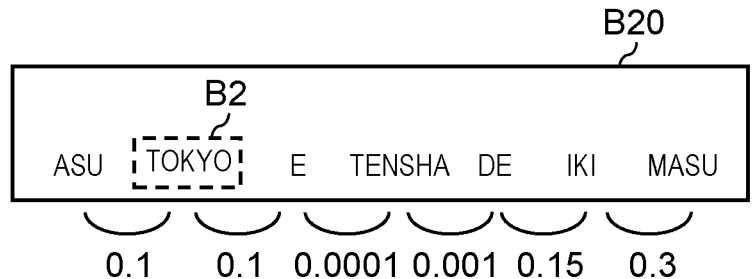
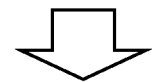
(C) VOICE RECOGNITION TEXT
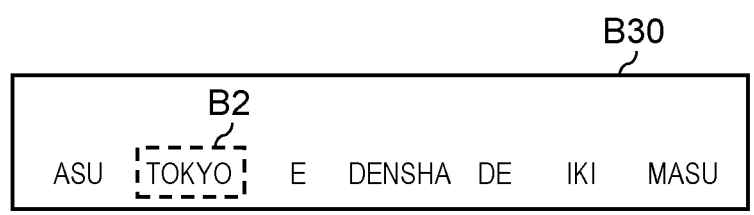

■ EXAMPLE OF USING PAST DATA (TRANSLATION) UPON RE-UTTERANCE

(A) FIRST VOICE RECOGNITION          "BASUDE TOKYOE IKEMASU"

(B) FIRST TRANSLATION          You can go to Tokyo by bath
　　　　　　　　　　　　　　　0.3  0.1  0.3  0.05  0.03  0.0

(C) SECOND VOICE RECOGNITION          "TOKYO EWA BASUDE IKEMASU"

(D) SECOND TRANSLATION          To Tokyo you can go by bus
　　　　　　　　　　　　　　　0.01  0.0  0.3  0.1  0.01  0.02

(E) TRANSLATION TEXT          You can go to Tokyo by bus
　　　　　　　　　　　　　　0.3  0.1  0.3  0.01  0.01  0.02

FIG. 12

| EVALUATION VALUE FOR VOICE RECOGNITION | EVALUATION VALUE FOR TRANSLATION | EVALUATION VALUE FOR IDENTITY | CONTENTS OF MESSAGE |
|---|---|---|---|
| LOW | - | - | PLEASE SPEAK CLEARLY AGAIN |
| HIGH | LOW | - | PLEASE SPEAK AGAIN IN DIFFERENT EXPRESSION |
| HIGH | LOW | LOW | PLEASE SPEAK BRIEFLY AGAIN |
| HIGH | HIGH | LOW | PLEASE SPEAK AGAIN USING DIFFERENT WORDS |
| HIGH | HIGH | HIGH | (NO MESSAGE PRESENTED) | sine
TRANSLATION DEVICE AND SYSTEM WITH UTTERANCE REINPUT REQUEST NOTIFICATION

TECHNICAL FIELD

The present disclosure relates to a translation device configured to translate utterance acquired in a language into another language.

BACKGROUND ART

PTL 1 discloses a translation system configured to translate by means of an automatic translation function of a computing machine. This translation system includes a translation converter configured to translate a language input via a language input unit by a first person into a translation language for a second person, a retranslation converter configured to retranslate the input language into a translation language for the first person, and a feedback language output unit configured to constantly present the first person with the retranslation language. The first person can thus check whether or not the translation language for the second person constantly has correct contents, and reinput different expression preferred for interpretation of the input language when the expressed contents are unintended.

CITATION LIST

Patent Literature

PTL 1: Unexamined Japanese Patent Publication No. 4-319769

SUMMARY

The present disclosure provides a translation device configured to acquire utterance in a first language by a speaker, translate contents of the utterance into a second language for information presentation, and request the speaker to reinput when voice recognition processing or translation processing has an inappropriate result.

A translation device according to an aspect of the present disclosure is configured to acquire utterance spoken by a speaker in a first language and translate contents of the utterance into a second language for information presentation. The translation device includes an input unit, a controller, a notification unit, and a storage. The input unit acquires the utterance in the first language and generates voice data from the utterance. The controller acquires a first evaluation value for voice recognition data obtained through voice recognition processing of the voice data. The notification unit presents the speaker with information on utterance reinput request. The storage stores the voice recognition data as past voice recognition data. The notification unit presents first information on utterance reinput request when the first evaluation value is less than or equal to a first predetermined value. The controller generates new voice recognition data with reference to the past voice recognition data and voice recognition data of reinput utterance, when the voice recognition data of the reinput utterance has an evaluation value less than or equal to a predetermined value.

The translation device according to the present disclosure achieves requesting the speaker to reinput when voice recognition processing or translation processing has an inappropriate result. The translation device can present the speaker with information having contents appropriate for a processing result.

BRIEF DESCRIPTION OF DRAWINGS

FIG. 4 is a table exemplifying messages presented in a case where each processing results in a low evaluation value.

FIG. 8 is an explanatory view of processing of generating new voice recognition text with reference to past voice recognition data upon reinput of utterance.

FIG. 12 is a table exemplifying messages presented in a case where each processing results in a low evaluation value.

DESCRIPTION OF EMBODIMENTS

Exemplary embodiments will now be described in detail below with reference to the drawings where appropriate. The following description may not include unnecessarily detailed description. For example, the following description may not include detailed description of a well-known matter and repeated description of substantially identical configurations. This is to prevent unnecessary redundancy in the following description and to facilitate comprehension by those skilled in the art.

The inventors provide the accompanying drawings and the following description to help those skilled in the art to fully comprehend the present disclosure, but do not intend to limit subject matters recited in the claims with the drawings and the description.

First Exemplary Embodiment

A first exemplary embodiment will be described below with reference to FIGS. 1 to 5. Described below is a translation device including a voice input device and adopting a voice input method according to the present disclosure.

[1-1. Configuration]

Figure 1:
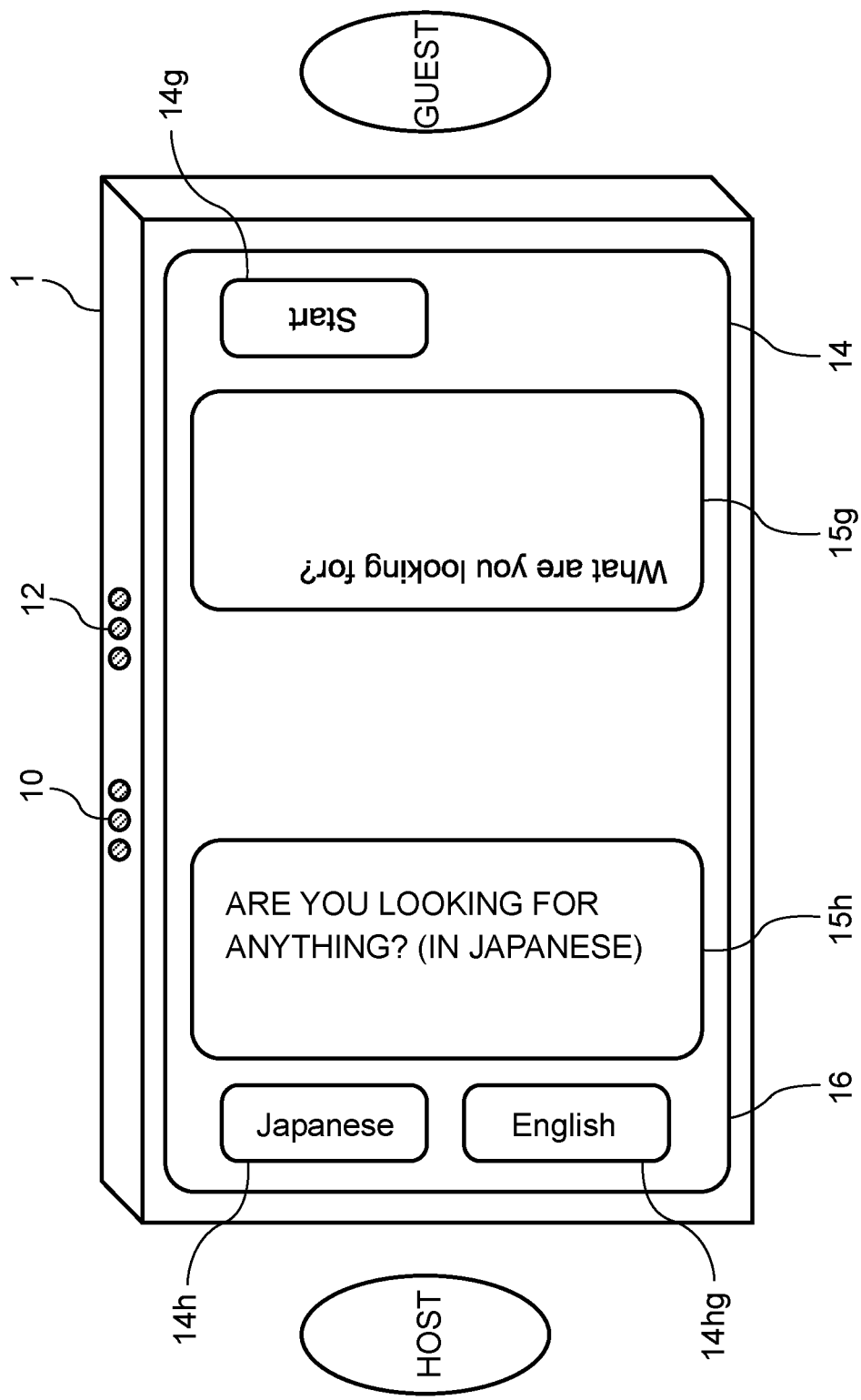
FIG. 1 is an outer appearance view of a translation device according to a first exemplary embodiment.

FIG. 1 is an outer appearance view of the translation device according to the first exemplary embodiment. Translation device 1 depicted in FIG. 1 is a tablet device or the like, and is configured to translate conversation between two users speaking different languages. The present exemplary embodiment assumes that translation device 1 translates face-to-face conversation between a guest (traveler) speaking English and a host (guide) speaking Japanese and guiding the guest.

Translation device 1 includes microphone 10, speaker unit 12, display 14, and touch panel 16. Microphone 10 and speaker unit 12 can be disposed near openings in a side surface of translation device 1. Display 14 and touch panel 16 are disposed on a primary surface of translation device 1. Display 14 has an area near a first end in a longitudinal direction (e.g., adjacent to the host), and the area includes utterance icons 14h, 14hg and display area 15h. Display 14 has an area near a second end in the longitudinal direction (e.g., adjacent to the guest), and the area includes utterance icon 14g and display area 15g. Utterance icons 14h, 14g, 14hg accept touch operation by the users. The touch operation according to the present exemplary embodiment includes operation of touching and leaving an area corresponding to each of utterance icons 14h, 14g, 14hg on touch panel 16 with a finger of the host or the guest, as well as operation of touching, then sliding, and leaving this area with the finger of the host or the guest.

Utterance icon 14h is an operation icon to be operated by the host to specify start and end points of own utterance when the host gives the utterance (i.e., upon inputting utterance in Japanese to translation device 1). Utterance icon 14g is an operation icon to be operated by the guest to specify start and end points of own utterance when the guest gives the utterance (i.e., upon inputting utterance in English). Utterance icon 14hg is an operation icon to be operated by the host in place of the guest to specify start and end points of utterance by the guest when the guest gives the utterance (e.g., upon inputting utterance in English). Display areas 15h, 15g are provided for display of a result of voice recognition, translation, reverse translation, or the like in the form of a character string.

Figure 2:
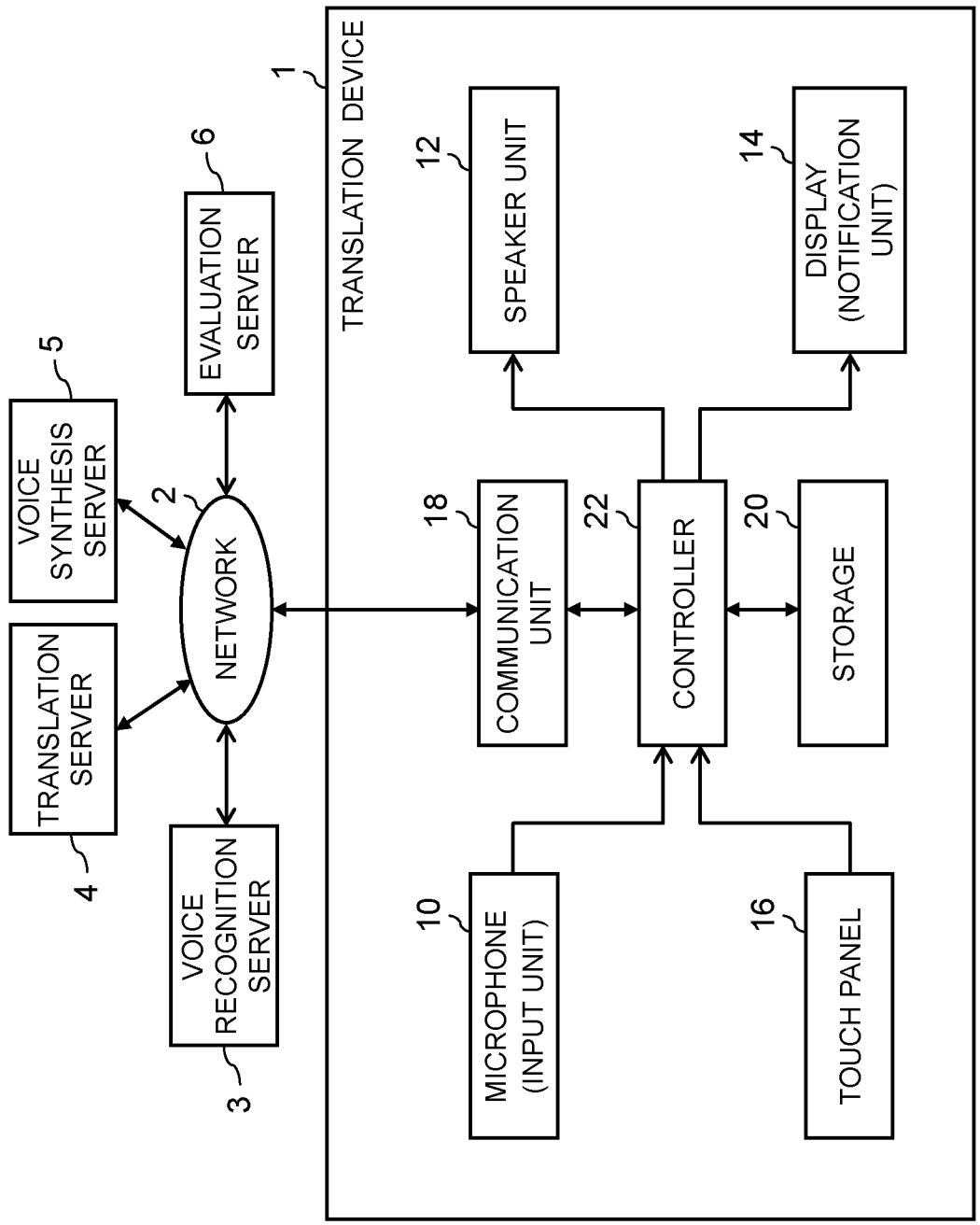
FIG. 2 is a block diagram depicting an electric configuration of the translation device.

FIG. 2 is a block diagram depicting an electric configuration of translation device 1 according to the first exemplary embodiment. Translation device 1 executes data communication with voice recognition server 3, translation server 4, voice synthesis server 5, and evaluation server 6 via network 2 like the Internet.

Voice recognition server 3 receives digital voice data from translation device 1 via network 2 and executes voice recognition of the digital voice data thus received to generate voice recognition data in the form of a character string.

Translation server 4 receives the voice recognition data from translation device 1 via network 2 and translates the voice recognition data thus received to generate translation data in the form of a character string.

Voice synthesis server 5 receives the translation data in the form of a character string from translation device 1 via network 2 and executes voice synthesis of the translation data in the form of a character string thus received to generate a voice signal.

Evaluation server 6 receives the voice recognition data or the translation data from translation device 1 via network 2 and calculates an evaluation value indicating a level of "sentence perfection" of a sentence according to the voice recognition data or the translation data. Such "sentence perfection" indicates appropriateness as a sentence in the language of the sentence.

Translation device 1 includes microphone 10, speaker unit 12, display 14, touch panel 16, as well as communication unit 18, storage 20, and controller 22.

Microphone 10 is a device configured to convert voice into digital voice data. Specifically, microphone 10 converts voice into a voice signal (analog electric signal), and further converts the voice signal into digital voice data with use of an AD converter. In other words, microphone 10 acquires utterance by a speaker and generates voice data according to the utterance.

Communication unit 18 is a communication module configured to execute data communication with voice recognition server 3, translation server 4, voice synthesis server 5, and evaluation server 6 via network 2 in accordance with a communication system such as Bluetooth (registered trademark), Wi-Fi (registered trademark), 3G, long term evolution (LTE) (registered trademark), or the Institute of Electrical and Electronics Engineers (IEEE) 802.11.

Storage 20 is a recording medium including a flash memory, a ferroelectric memory, a hard disk drive (HDD), a solid state drive (SSD), or the like. Storage 20 stores digital voice data from microphone 10 and translation data from translation server 4. Storage 20 also stores various programs for controller 22.

Controller 22 includes a central processing unit (CPU), a micro processing unit (MPU), or the like and executes the various programs stored in storage 20 to control entire behavior of translation device 1. Controller 22 according to the present exemplary embodiment has a function that is achieved through cooperation between hardware and software, and can alternatively be achieved only with a hardware circuit dedicatedly designed for achievement of a predetermined function. Controller 22 is not limited to the CPU or the MPU, but can include a digital signal processor (DSP), a field programmable gate array (FPGA), an application specific integrated circuit (ASIC), or the like.

Speaker unit 12 is configured to convert an electric signal into voice. Speaker unit 12 outputs voice according to the voice signal (electric signal) from controller 22.

Display 14 is configured to display an image, and is configured by a liquid crystal display device or an organic electroluminescence (EL) display device. Display 14 displays, in display area 15h, 15g, an image according to voice recognition data, translation data, or reverse translation data from controller 22. Display 14 exemplifies a notification unit configured to present the host and the guest with voice recognition data, translation data, and reverse translation data. Display 14 also displays utterance icons 14h, 14g, 14hg described above.

Touch panel 16 is an operation unit to be operated by the user and accepts a command from the user. Touch panel 16 is superimposed on display 14.

[1-2. Behavior]

Translation device 1 configured as described above will be described in terms of behavior.

Translation device 1 transmits, to voice recognition server 3 via network 2, digital voice data according to voice input to microphone 10 during a voice input period. Voice recognition server 3 executes voice recognition of the voice data thus received to generate voice recognition data (text data)

in the form of a character string. Translation device 1 receives the voice recognition data from voice recognition server 3 via network 2.

Translation device 1 transmits the voice recognition data to translation server 4 via network 2. Translation server 4 translates the voice recognition data thus received to generate translation data (text data) in the form of a character string. Translation device 1 receives the translation data from translation server 4 via network 2.

Translation device 1 transmits the translation data to voice synthesis server 5 via network 2. Voice synthesis server 5 synthesizes voice in accordance with the translation data thus received to generate a voice signal. Translation device 1 then receives the voice signal from voice synthesis server 5 via network 2.

Translation device 1 outputs, from speaker unit 12, voice expressing a translation result in accordance with the voice signal thus received. Translation device 1 simultaneously presents on display 14 text information (the translation result) according to the translation data.

When translation device 1 translates utterance by the host, translation device 1 initially determines a voice input period for voice recognition in accordance with touch operation by the host to utterance icon 14*h* on touch panel 16. Specifically, translation device 1 determines a start point of the voice input period when the host firstly touches utterance icon 14*h*, and determines an end point of the voice input period when the host secondly touches utterance icon 14*h*. Translation device 1 executes voice recognition and translation of voice of the host input to microphone 10 during the voice input period from the start point to the end point thus determined. The end point of utterance can alternatively be set after elapse of predetermined time from the start point, in consideration of possible failure in touching the operation icon or redundant voice input. Translation device 1 outputs the voice expressing the translation result from speaker unit 12. Translation device 1 simultaneously presents the translation result in the form of a character string in display area 15*g* adjacent to the guest, of display 14, and presents the voice recognition result (as well as the reverse translation result as necessary) in the form of a character string in display area 15*h* adjacent to the host, of display 14.

When translating utterance by the guest, translation device 1 initially determines a voice input period in accordance with touch operation by the guest to utterance icon 14*g* on touch panel 16. Specifically, translation device 1 determines a start point of the voice input period when the guest firstly touches utterance icon 14*g*, and determines an end point of the voice input period when the guest secondly touches utterance icon 14*g*. Translation device 1 executes voice recognition and translation of voice of the guest input to microphone 10 during the voice period from the start point to the end point thus determined. Similarly to the above case, the end point of utterance can alternatively be set after elapse of predetermined time from the start point, in consideration of possible failure in touching the operation icon or redundant voice input. Translation device 1 outputs, from speaker unit 12, the translation result in the form of voice. Translation device 1 simultaneously presents the translation result in the form of a character string in display area 15*h* adjacent to the host, of display 14, and presents the voice recognition result (as well as the reverse translation result as necessary) in the form of a character string in display area 15*g* adjacent to the guest, of display 14.

Translation device 1 thus configured will not eventually obtain a correct translation result if halfway voice recognition processing or translation processing does not have a result of appropriate language expression. With such an eventually inappropriate translation result, the user needs extra time to reinput utterance (voice). In an exemplary case where voice recognition processing has an inappropriate result, subsequent translation processing, voice synthesis processing, and the like need to be executed even though no correct result may be obtained eventually. In another case where translation processing has an inappropriate result, subsequent voice synthesis processing and the like also need to be executed. Such eventually useless processing needs time to be executed.

Figure 3:
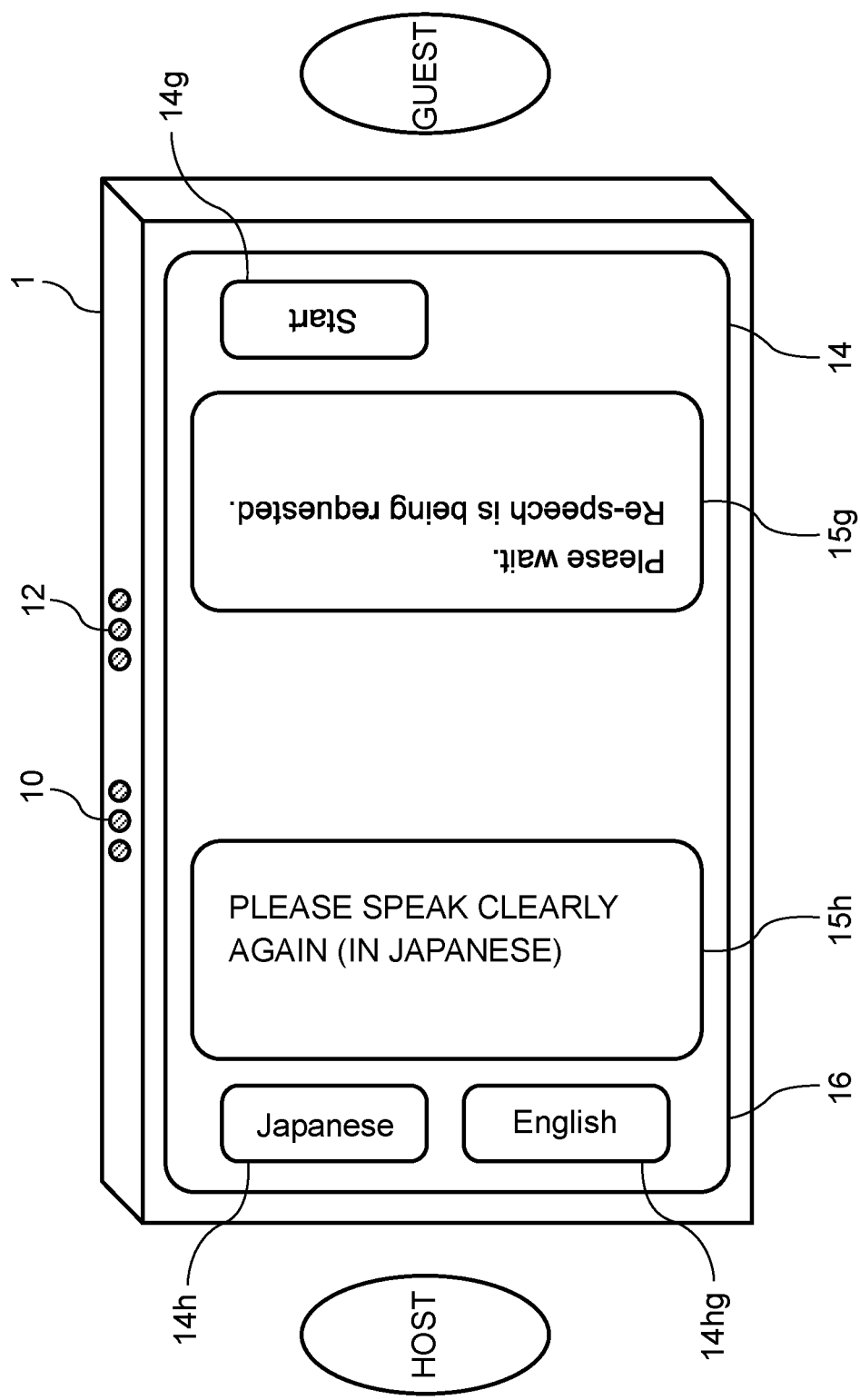
FIG. 3 is a view exemplifying display of reinput request in a case where voice recognition of host utterance results in a low evaluation value.

In view of this, the present exemplary embodiment includes, instead of executing subsequent processing, requesting the user to reinput utterance (voice) when voice recognition processing or translation processing has an inappropriate result and such inappropriateness is detected. In an exemplary case where voice recognition of utterance by the host has a determination result of inappropriateness as a sentence in Japanese, subsequent processing is not executed and display area 15*h* adjacent to the host has a message requesting reinput of utterance, as depicted in FIG. 3. This eliminates useless processing according to inappropriate text information and enables promptly requesting the user to reinput utterance (voice).

FIG. 4 is a table exemplifying messages displayed upon utterance reinput request. When voice recognition has a low evaluation result, there is displayed a message "Please speak clearly again" (exemplifying first information). When translation processing has a low evaluation result, there is displayed a message "Please speak again in different expression" (exemplifying second information). When reverse translation (to be described later) has a low evaluation result, there is displayed a message "Please check whether or not your partner receives what you want to tell" (exemplifying fourth information). The message requesting reinput is not displayed when voice recognition, translation processing, and reverse translation processing each have high evaluation. In this manner, the displayed message varies in accordance with the type of processing having low evaluation. This achieves more accurate notification to the user of what to focus upon reinput of utterance, to reduce a risk of third input of utterance. The first exemplary embodiment does not include evaluation of reverse translation.

Figure 5:
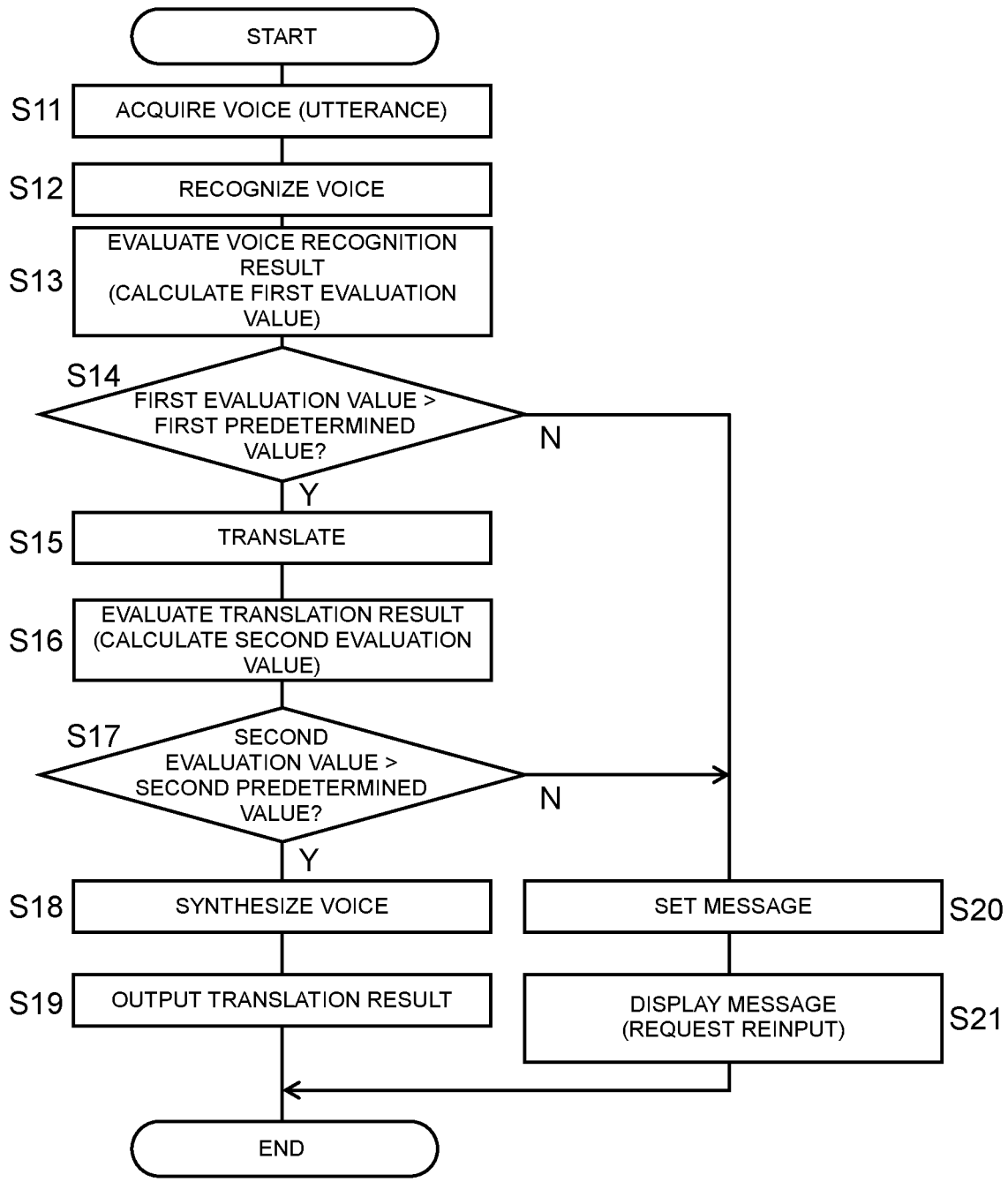
FIG. 5 is a flowchart of translation processing executed by a controller included in the translation device according to the first exemplary embodiment.

FIG. 5 is a flowchart of translation processing executed by controller 22 of translation device 1 according to the first exemplary embodiment. The translation processing executed by translation device 1 will be described below with reference to the flowchart in FIG. 5. The following description assumes a case where translation device 1 translates utterance (voice) in Japanese by the host (e.g., a guide) into English and a result of the translation is presented to the guest (e.g., a traveler).

Microphone 10 acquires utterance (voice) of the user and generates voice data (S11). Controller 22 acquires the voice data from microphone 10 and executes voice recognition to generate voice recognition data in the form of a character string (S12). Specifically, controller 22 transmits the voice data to voice recognition server 3 via communication unit 18. Voice recognition server 3 executes voice recognition in accordance with the voice data thus received, generates voice recognition data, and transmits the voice recognition data thus generated to translation device 1.

Controller 22 subsequently evaluates the voice recognition data thus received (S13). Specifically, controller 22 transmits the voice recognition data thus received to evaluation server 6 via communication unit 18. Evaluation server 6 calculates, from text (hereinafter, referred to as "voice recognition text") obtained from the voice recognition data thus received, a first evaluation value indicating a level of "sentence perfection" of a Japanese sentence according to the voice recognition text (S13).

Such "sentence perfection" indicates appropriateness as to whether or not the sentence appears naturally. The level of "sentence perfection" is calculated in accordance with appearance probability of each word configuring the sentence. Specifically, the level of "sentence perfection" relates to evaluation of a first word according to appearance probability of the first word in positional relation with a second word adjacent to the first word. The appearance probability of the first word is preliminarily calculated through analysis of mass sentence data. An N-gram model (a bi-gram model (N=2) in the present exemplary embodiment) exemplifies a technique of evaluating sentence perfection in accordance with such appearance probability. Evaluation server 6 stores information (a table) that is generated by preliminary data analysis according to the N-gram model and correlates a first word with appearance probability of the first word before or after a second word adjacent to the first word.

Figure 6:
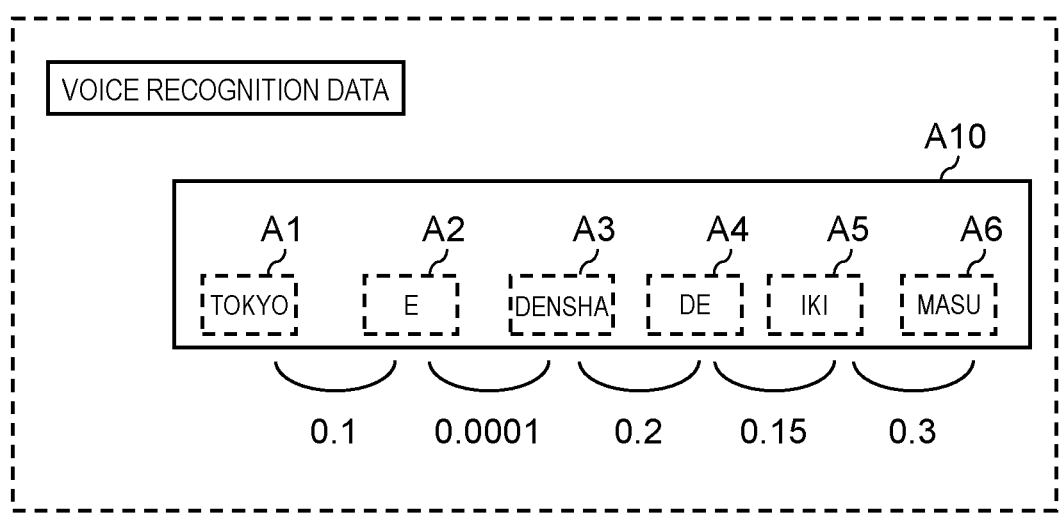
FIG. 6 is a view exemplifying voice recognition data (voice recognition text).

Assume an exemplary case of obtaining voice recognition text of sentence A10 depicted in FIG. 6. FIG. 6 exemplifies a case where word A2 appears subsequently to word A1 with probability of 0.1, word A3 appears subsequently to word A2 with probability of 0.0001, word A4 appears subsequently to word A3 with probability of 0.2, word A5 appears subsequently to word A4 with probability of 0.15, and word A6 appears subsequently to word A5 with probability of 0.3. Evaluation server 6 obtains, as the first evaluation value for sentence perfection, a geometrical mean of appearance probability values of the respective words. Sentence A10 has the first evaluation value obtained as a fifth root of (0.1×0.0001× 0.2×0.15×0.3). The first evaluation value is set to be higher as "sentence perfection" has a higher level in this example.

Evaluation server 6 transmits the first evaluation value thus obtained to translation device 1. Controller 22 of translation device 1 compares the first evaluation value with a first predetermined value (S14).

In a case where the first evaluation value is less than or equal to the first predetermined value (NO in S14), controller 22 sets a message (first information) requesting the host to reinput utterance (voice) (S20). Controller 22 also sets a message to the guest. Controller 22 then presents in display area 15h adjacent to the host, of display 14, the message requesting the host to reinput (S21). Controller 22 simultaneously presents the message to the guest also in display area 15g adjacent to the guest. This completes the translation processing.

FIG. 3 exemplifies a case where display area 15h has a message "Please speak clearly again (in Japanese)" to the host and display area 15g has a message "Please wait. Re-speech is being requested." to the guest. These messages are displayed to allow the host to recognize necessity of reinput of voice (utterance) as well as allow the guest to recognize necessity of waiting for a while for reinput of voice. The message "Please speak clearly (in Japanese)" also allows the host to recognize that own voice (utterance) has been unclear and next utterance needs to have clearer pronunciation.

In another case where the first evaluation value exceeds the first predetermined value (YES in S14), controller 22 executes translation processing according to the voice recognition data (voice recognition text) (S15). Specifically, controller 22 transmits the voice recognition data to translation server 4 via communication unit 18. Translation server 4 translates the voice recognition data thus received and transmits, to translation device 1, translation data including text according to a translation result.

Controller 22 of translation device 1 having received the translation data (text data) evaluates the translation data thus received (S16). Specifically, controller 22 transmits the translation data thus received to evaluation server 6 via communication unit 18. Evaluation server 6 calculates, from text (hereinafter, referred to as "translation text") obtained from the translation data thus received, a second evaluation value indicating a level of "sentence perfection" of an English sentence according to the translation text (S16), and transmits the second evaluation value thus calculated to translation device 1.

Controller 22 of translation device 1 compares the second evaluation value with a second predetermined value (S17).

In a case where the second evaluation value is less than or equal to the second predetermined value (NO in S17), controller 22 sets a message (second information) requesting the host to reinput utterance (voice) (S20). Controller 22 also sets a message to the guest. The set message is different in terms of contents from the message requesting reinput when the first evaluation value for a voice recognition result is low, as depicted in FIG. 4. In an exemplary case where the first evaluation value for the voice recognition result is low, there is displayed a message "Please speak clearly again". In another case where the second evaluation value for the translation result is low, there is displayed a message "Please speak again in different expression". Different messages are displayed in accordance with different reinput reasons in these manners, to allow the user to recognize a reinput reason and be requested to reinput more appropriate utterance.

Controller 22 then displays in display area 15h adjacent to the host, of display 14, a message requesting the host to reinput (S21). Controller 22 simultaneously presents the message to the guest also in display area 15g adjacent to the guest. This completes the translation processing.

In another case where the second evaluation value exceeds the second predetermined value (YES in S17), controller 22 transmits the translation data to voice synthesis server 5 for execution of voice synthesis processing (S18). Voice synthesis server 5 executes voice synthesis in accordance with the translation data thus received, and transmits, to translation device 1, voice data for generation of voice expressing the translation result.

Controller 22 of translation device 1 outputs, from speaker unit 12, voice according to the voice data received from voice synthesis server 5 (S19). Controller 22 simultaneously presents, in display area 15h of display 14, a sentence according to the translation data (S19).

As described above, the utterance by the host is translated and the translation result is presented to the guest in the form of voice and character information. In particular, translation device 1 according to the present exemplary embodiment displays a message requesting the user to reinput without executing subsequent processing, when each of voice recognition processing and translation processing has an evaluation result of inappropriateness as a sentence (lacking sentence perfection). This configuration eliminates execution of useless processing according to an inappropriate voice recognition or translation result and enables promptly requesting the user to reinput. The displayed message requesting the user to reinput differs in accordance with whether voice recognition or translation has a low evaluation result. This achieves display of an appropriate message according to a situation. The user can recognize how to reinput with reference to the message.

[1-3. Effects and Others]

As described above, translation device 1 according to the present exemplary embodiment is configured to acquire utterance in the first language (e.g., Japanese) by the speaker and translate contents of the utterance into the second language (e.g., English) for information presentation. Translation device 1 includes microphone 10 (exemplifying an input unit), controller 22, and display 14 (exemplifying a notification unit). Microphone 10 acquires utterance in the first language and generates voice data according to the utterance. Controller 22 obtains the first evaluation value for voice recognition data obtained through voice recognition processing of the voice data, and the second evaluation value for translation data obtained through translation processing of the voice recognition data into the second language. Display 14 presents a first message requesting reinput of utterance when the first evaluation value is less than or equal to the first predetermined value (S14), and presents a second message requesting reinput of utterance and being different from the first message (S21) when the first evaluation value is more than the first predetermined value and the second evaluation value is less than or equal to the second predetermined value (S17).

Translation device 1 configured as described above displays a message requesting the speaker to reinput when each of voice recognition processing and translation processing has an evaluation result of inappropriateness as a sentence (lacking sentence perfection). This enables promptly requesting the speaker to reinput. The displayed message requesting the speaker to reinput differs in accordance with whether voice recognition or translation has a low evaluation result. This achieves display of an appropriate message according to a processing result. The speaker can recognize how to reinput with reference to the message.

Controller 22 executes neither translation processing (S15) nor voice synthesis processing (S18) subsequent to voice recognition processing, when the first evaluation value for a result of the voice recognition processing is found to be less than or equal to the first predetermined value. Furthermore, controller 22 does not execute subsequent voice synthesis processing (S18) when the second evaluation value for a result of translation processing is found to be less than or equal to the second predetermined value. This enables promptly requesting the speaker to reinput.

Second Exemplary Embodiment

Description is made to translation device 1 according to a different exemplary embodiment. Translation device 1 according to the present exemplary embodiment is configured to generate voice recognition data or translation data with reference to past data when voice recognition or translation of reinput utterance has a low evaluation result. Translation device 1 according to the present exemplary embodiment is similar in hardware configuration to the translation device according to the first exemplary embodiment.

Figure 7:
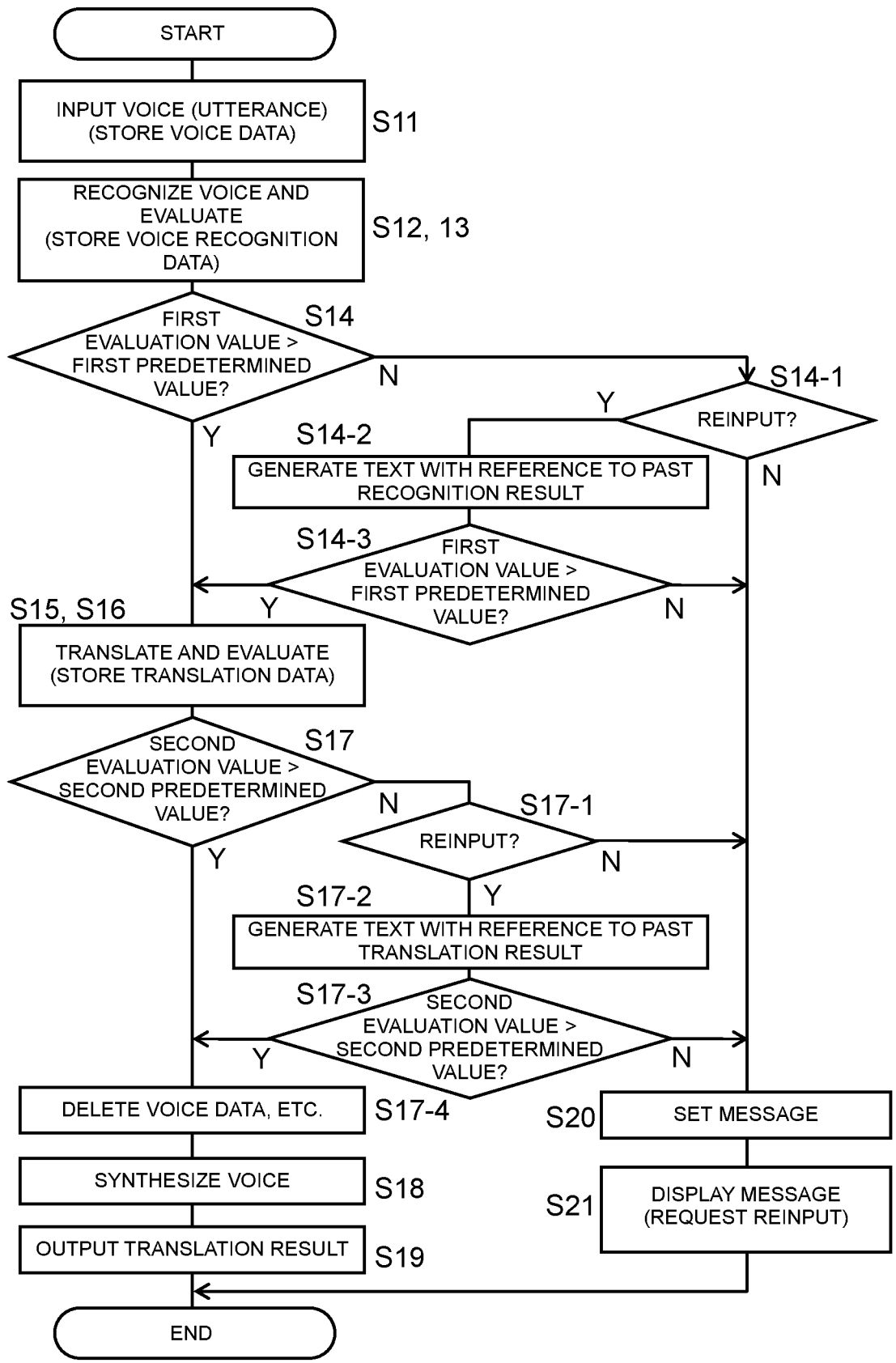
FIG. 7 is a flowchart of translation processing executed by a controller included in a translation device according to a second exemplary embodiment.

FIG. 7 is a flowchart of translation processing executed by translation device 1 according to the second exemplary embodiment. The flowchart in FIG. 7 includes, in addition to steps S11 to S21 included in the flowchart in FIG. 5 according to the first exemplary embodiment, steps S14-1 to S14-3, S17-1 to S17-4.

Processing from step S11 to step S21 according to the present exemplary embodiment is basically similar to that described in the first exemplary embodiment. Described below are differences from the processing included in the flowchart according to the first exemplary embodiment.

Controller 22 according to the present exemplary embodiment stores in storage 20, voice data, voice recognition data, and translation data, upon acquisition of the voice data (S11), upon acquisition of the voice recognition data (S12), and upon acquisition of the translation data (S15), respectively. Controller 22 does not necessary store in storage 20 all of the voice data, the voice recognition data, and the translation data. Controller 22 can alternatively store only the voice data and generate voice recognition data and translation data from the stored voice data as necessary. Controller 22 can still alternatively store in storage 20 only the voice recognition data and the translation data, without storing the voice data.

If the first evaluation value for a voice recognition result is less than or equal to the first predetermined value (NO in S14), controller 22 determines whether or not current utterance input corresponds to reinput request (S14-1).

In a case where the current utterance input does not correspond to reinput request (NO in S14-1), controller 22 sets a message requesting reinput (S20) and presents the message on display 14 (S21), as in the first exemplary embodiment.

In another case where the current utterance input corresponds to reinput request (YES in S14-1), controller 22 generates new voice recognition text with reference to a past voice recognition result (S14-2). Controller 22 generates the new voice recognition text with reference to current voice recognition text (voice recognition data of reinput utterance) and previous voice recognition text (past voice recognition data), for example. An exemplary case will be described with reference to FIG. 8.

FIG. 8 exemplifies sentence B10 as the previous (first) voice recognition text, and sentence B20 as the current (second) voice recognition text. In this case, sentence B30 as the new voice recognition text is generated in accordance with the previous voice recognition text and the current voice recognition text. Specifically, among words configuring the previous voice recognition text, a word having appearance probability less than a predetermined value is replaced with a word positioned correspondingly in the current voice recognition text. As exemplified in FIG. 8, word B1 in the previous voice recognition text has appearance probability (0.001) less than the predetermined value (e.g., 0.005) and is thus replaced with word B2 in the current voice recognition text to obtain sentence B30 as new voice recognition text.

Controller 22 can alternatively generate new voice recognition data through selection of a word having higher appearance probability between the previous voice recognition text and the current voice recognition text. Specifically, controller 22 does not execute comparison with the predetermined value but compares appearance probability (0.001) of word B1 in sentence B10 with appearance probability (0.1) of word B2 included in sentence B20 and corresponding to word B1. Controller 22 can then generate sentence B30 through selection of word B2 having higher appearance probability.

With reference to FIG. 7 again, controller 22 then evaluates the new voice recognition text (S14-3). The voice recognition text is evaluated in accordance with the method described earlier (steps S13, S14). In a case where the new voice recognition text has low evaluation (NO in S14-3), in other words, where the first evaluation value for the new voice recognition text is less than or equal to the first predetermined value, controller 22 sets a message requesting reinput (S20) and presents the message on display 14 (S21). In another case where the new voice recognition text has high evaluation (YES in S14-3), the flow proceeds to translation steps (S15, S16).

If the second evaluation value for the translation result is less than or equal to the second predetermined value (NO in S17), controller 22 determines whether or not current utterance input corresponds to reinput request (S17-1).

In a case where the current utterance input does not correspond to reinput request (NO in S17-1), controller 22 sets a message requesting reinput (S20) and presents the message on display 14 (S21), as in the first exemplary embodiment.

In another case where the current utterance input corresponds to reinput request (YES in S17-1), controller 22 generates new translation text with reference to a past translation result (S17-2). Controller 22 generates the new translation text with reference to current translation text and previous translation text, for example. An exemplary case will be described with reference to FIG. 9.

Figure 9:
FIG. 9 is an explanatory view of processing of generating new voice recognition text with reference to past translation data upon reinput of utterance.

FIG. 9 exemplifies the past (first) translation text "You can go to Tokyo by bath" and the current (second) translation text "To Tokyo you can go by bus". In this case, there is generated new translation text "You can go to Tokyo by bus" in accordance with the previous translation text and the current translation text. Specifically, a word having appearance probability less than or equal to the predetermined value in the previous translation text is replaced with a word positioned correspondingly in the current voice recognition text. As exemplified in FIG. 9, "bath" in the previous translation text has appearance probability (0.0) less than the predetermined value (e.g., 0.005) and is thus replaced with "bus" in the current translation text to obtain new translation text.

Controller 22 can alternatively generate new translation data through selection of a word having higher appearance probability between the previous translation text and the current translation text. Specifically, controller 22 does not execute comparison with the predetermined value but compares appearance probability (0.0) of "bath" with appearance probability (0.02) of "bus". Controller 22 can then generate new translation data through selection of "bus" having higher appearance probability.

With reference to FIG. 7 again, controller 22 thereafter evaluates the new translation text (S17-3). The translation text is evaluated in accordance with the method described earlier (steps S16, S17). In a case where the new translation text has low evaluation (NO in S17-3), in other words, where the second evaluation value for the new translation text is less than or equal to the second predetermined value, controller 22 sets a message requesting reinput (S20) and presents the message on display 14 (S21). In another case where the new translation text has an evaluation value exceeding the predetermined value (YES in S17-3), controller 22 deletes past voice data, past voice recognition data, and past translation data stored in storage 20 (S17-4). In other words, storage 20 continuously stores the respective data of input utterance until new translation text achieves high evaluation. Storage 20 can thus continuously hold data necessary for generation of new translation text until new translation text achieves high evaluation.

As described above, the present exemplary embodiment includes generating new text to be processed with reference to past voice recognition data or past translation data when voice recognition or translation of reinput utterance has an unpreferred result. This lowers frequency of reinput and accordingly reduces time necessary for translation processing.

Controller 22 deletes voice recognition data from storage 20 in step S17-4 described above. Controller 22 can alternatively delete past voice recognition data from storage 20 when new voice recognition data has an evaluation value exceeding the predetermined value in step S14-3.

Controller 22 of translation device 1 according to the present exemplary embodiment generates new voice recognition data or new translation data. The present disclosure is, however, not limited to this configuration. Evaluation server 6 can alternatively generate new voice recognition data or new translation data.

If NO in step S14-3, display 14 can alternatively present new voice recognition data in step S20, in addition to information on utterance reinput request. The speaker can accordingly recognize new voice recognition data upon reinput of utterance.

Third Exemplary Embodiment

Described below is a translation device according to a still different exemplary embodiment. The translation device according to any one of the exemplary embodiments described above sets information to be presented to the speaker in accordance with the first evaluation value for voice recognition data in the first language (Japanese) or the second evaluation value for translation data in the second language (English). Simple evaluation according to each language model hardly leads to sufficient evaluation of translation appropriateness. In view of this, translation device 1 according to the present exemplary embodiment sets information to be presented to the speaker in accordance with a third evaluation value for identity between voice recognition data and translation data. The third evaluation value is generated in accordance with distributed representation for the voice recognition data and the translation data. Translation device 1 according to the present exemplary embodiment is similar in hardware configuration to the translation device according to the first exemplary embodiment.

Figure 10:
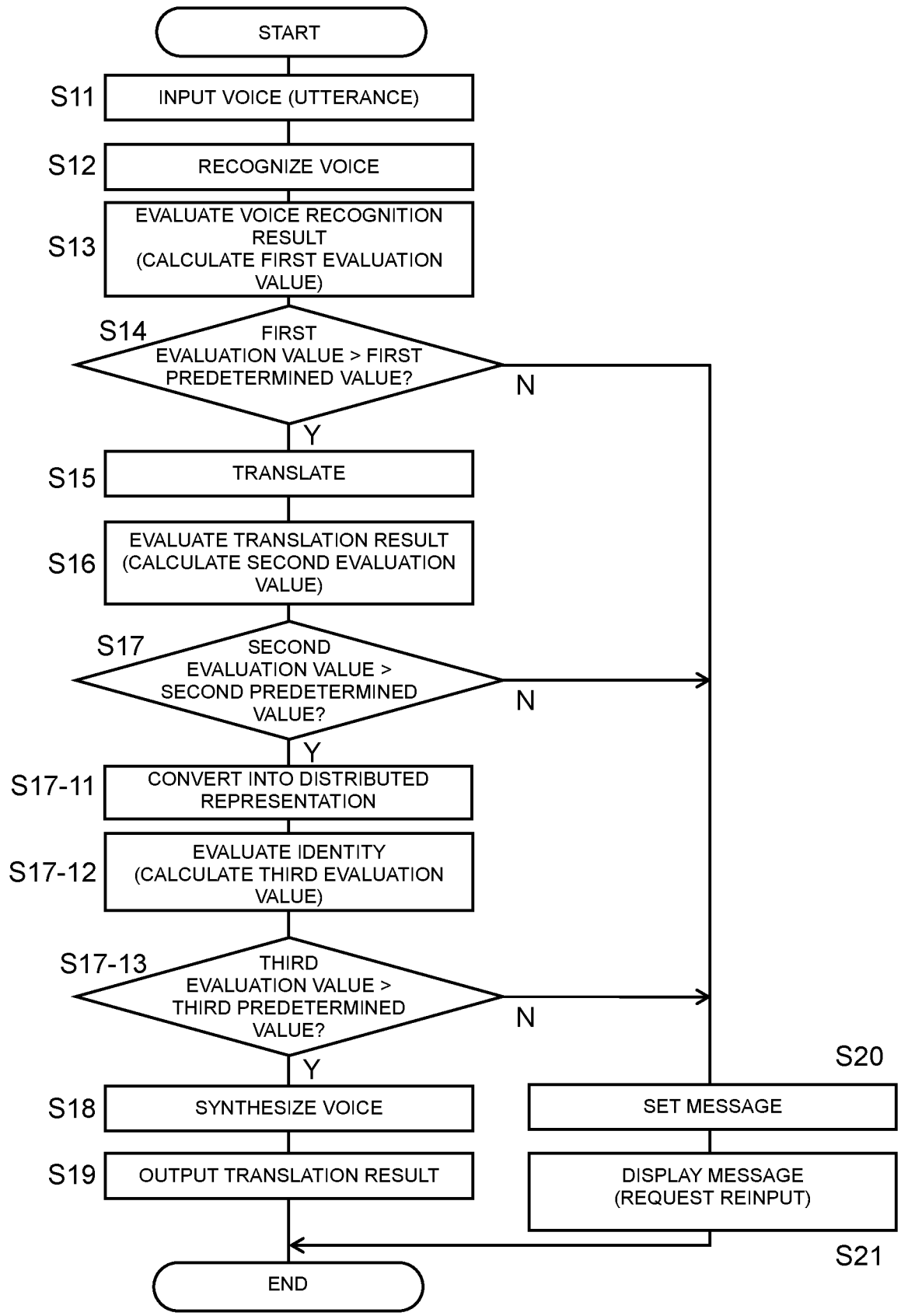
FIG. 10 is a flowchart of translation processing executed by a controller included in a translation device according to a third exemplary embodiment.

FIG. 10 is a flowchart of translation processing executed by translation device 1 according to the third exemplary embodiment. The flowchart in FIG. 10 includes, in addition to steps S11 to S21 included in the flowchart in FIG. 5 according to the first exemplary embodiment, steps S17-11 to S17-13.

Processing from step S11 to step S21 according to the present exemplary embodiment is basically similar to that described in the first exemplary embodiment. Described below are differences from the processing included in the flowchart according to the first exemplary embodiment.

Controller 22 of translation device 1 according to the present exemplary embodiment generates a first distributed representation group from voice recognition data in Japanese in accordance with a conversion table (first conversion table) for conversion of a Japanese word to distributed representation, if the second evaluation value exceeds the second predetermined value (YES in S17). Controller 22 further generates a second distributed representation group from translation data in English in accordance with a conversion table (second conversion table) for conversion of an English word to distributed representation (S17-11). These conversion tables may be prepared for conversion of not a word but a phrase or a sentence to distributed representation.

These distributed representation groups will be described below with reference to FIGS. 11A and 11B.

Figure 11A:
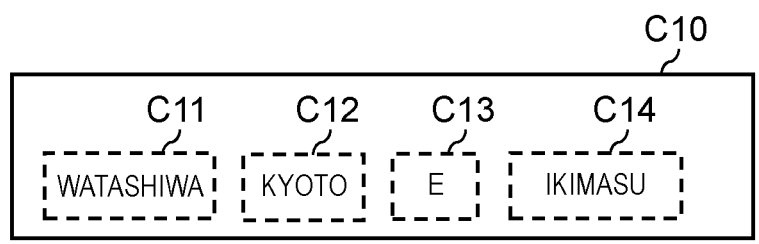
FIG. 11A is a view exemplifying voice recognition data.
Figure 11B:
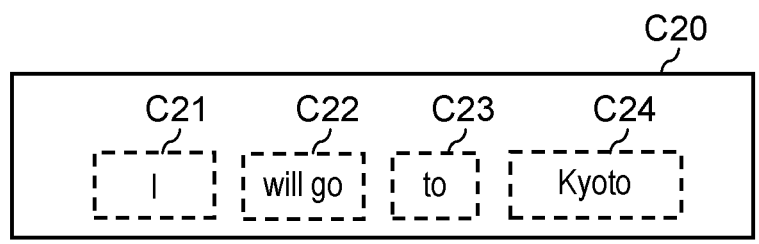
FIG. 11B is a view exemplifying translation data.

FIG. 11A is a view exemplifying voice recognition data in Japanese. FIG. 11B is a view exemplifying translation data in English. FIG. 11A depicts sentence C10 according to the voice recognition data in Japanese, and sentence C10 includes words C11 to C14. FIG. 11B similarly depicts sentence C20 according to the translation data in English, and sentence C20 includes words C21 to C24.

Controller 22 converts each of words C11 to C14 to distributed representation in accordance with the first conversion table. Such distributed representation is exemplified herein by representation for a word, a phrase, or a sentence with a vector including a plurality of combined numbers. The distributed representation is exemplified below as a word vector through representing, with a vector, a word or a plurality of combined words assumed as a single word. The distributed representation for each of words C11 to C14 configures the first distributed representation group. Controller 22 calculates a sum of the distributed representation indicated by vectors and included in the first distributed representation group. Controller 22 then calculates sentence vector $S_f$ of the first distributed representation group through division of the vectors as the sum of the distributed representation by four equal to a number of words. Assuming that the distributed representation for each of words C11 to C14 has vector $F_i$ and the number of words is N (N=4 in this case), sentence vector $S_f$ is expressed by expression (1) below.

[Formula 1]

$$Sf = \frac{1}{N}\sum_{i=1}^{N} Fi \qquad \text{Expression (1)}$$

Controller 22 similarly converts each of words C21 to C24 into distributed representation in accordance with the second conversion table. The distributed representation for each of words C21 to C24 configures the second distributed representation group. Controller 22 calculates a sum of the distributed representation indicated by vectors and included in the second distributed representation group. Controller 22 then calculates sentence vector $S_e$ of the second distributed representation group through division of the vectors as the sum of the distributed representation by four equal to the number of words. Assuming that the distributed representation for each of words C21 to C24 has vector $E_i$ and the number of words is M (M=4 in this case), sentence vector $S_e$ of the second distributed representation group is expressed by expression (2) below.

[Formula 2]

$$Se = \frac{1}{M}\sum_{i=1}^{M} Ei \qquad \text{Expression (2)}$$

The number (N) of words included in the first distributed representation group is equal to the number (M) of words included in the second distributed representation group in the present exemplary embodiment. It is possible to similarly calculate a sentence vector of each distributed representation group even when the number of words included in the first distributed representation group is different from the number of words included in the second distributed representation group.

The first conversion table and the second conversion table can alternatively be generated from a single parallel translation table (bilingual corpus). More specifically, the first conversion table may be generated from a Japanese part of the single parallel translation table, and the second conversion table may be generated from an English part of the parallel translation table. The conversion tables generated from the single parallel translation table achieve improvement in correspondence accuracy of distributed representation between the languages. This improves correspondence accuracy of the sentence vectors between the languages. This leads to improvement in accuracy of the third evaluation value calculated in accordance with the sentence vectors. A single parallel translation table can alternatively include two parallel translation tables substantially identical with each other. Improvement in accuracy of the third evaluation value is effected if the conversion tables are generated from two parallel translation tables including many common bilingual sentences.

Controller 22 generates the third evaluation value in accordance with sentence vector $S_f$ and sentence vector $S_e$ (S17-12). Specifically, the third evaluation value (cosine similarity: cos θ) is calculated by expression (3) below. The third evaluation value is thus generated in accordance with identity between the first distributed representation group and the second distributed representation group.

[Formula 3]

$$\cos\theta = \frac{SfSe}{|Sf||Se|} \qquad \text{Expression (3)}$$

Controller 22 compares the third evaluation value with a third predetermined value (S17-13). In a case where the third evaluation value is less than or equal to the third predetermined value (e.g., 0.8) (NO in S17-13), controller 22 sets a message (third information) requesting reinput of utterance (S20). As exemplified in FIG. 12, controller 22 sets a message requesting reinput of utterance, specifically, "Please speak again using different words". Display 14 then presents the host (speaker) with the message (S21).

In another case where the third evaluation value exceeds the third predetermined value (YES in S17-13), controller 22 executes voice synthesis (S18), outputs voice according to the translation result from speaker unit 12, and presents text according to the translation result in display areas 15h, 15g of display 14 (S19).

As depicted in FIG. 12, the third information is different from both the first information and the second information. In a case where display 14 presents the third information "Please speak again using different words", the speaker can recognize that there is a problem not in voice recognition processing or translation processing but in identity between voice recognition data and translation data. That is, the speaker can recognize that he or she needs to use different words in utterance because own utterance has contents inappropriate for translation processing.

As described above, the present exemplary embodiment includes presenting a message requesting reinput and different from the first information and the second information, in accordance with the third evaluation value for identity between voice recognition data and translation data. This enables presenting the speaker with an appropriate message.

Controller 22 executes processing in step S20 if the second evaluation value is less than or equal to the second predetermined value in step S17. Controller 22 can alternatively execute processing in step S17-11, regardless of the second evaluation value (skipping step S17). If the third evaluation value is less than or equal to the third predetermined value in step S17-13, controller 22 can alternatively set a message to be presented on display 14 in accordance with the second evaluation value and the third evaluation value (S20). Specifically, as depicted in FIG. 12, controller 22 may set a message "Please speak briefly again" as information on utterance reinput request if the second evaluation value is less than or equal to the second predetermined value and the third evaluation value is less than or equal to the third predetermined value. The speaker can thus recognize that there is a problem not in voice recognition processing but in translation processing and identity between voice recognition data and translation data. As described above, display 14 according to the present exemplary embodiment may present information on utterance reinput request, different from the first information, the second information, and the third information, if the second evaluation value is less than or equal to the second predetermined value and the third evaluation value is less than or equal to the third predetermined value.

The present exemplary embodiment adopts, as the third evaluation value, cosine similarity of respective sentence vectors. However, the present disclosure is not limited to this case. Examples of the third evaluation value include a Pearson's correlation coefficient and deviation pattern similarity.

Fourth Exemplary Embodiment

Figure 13:
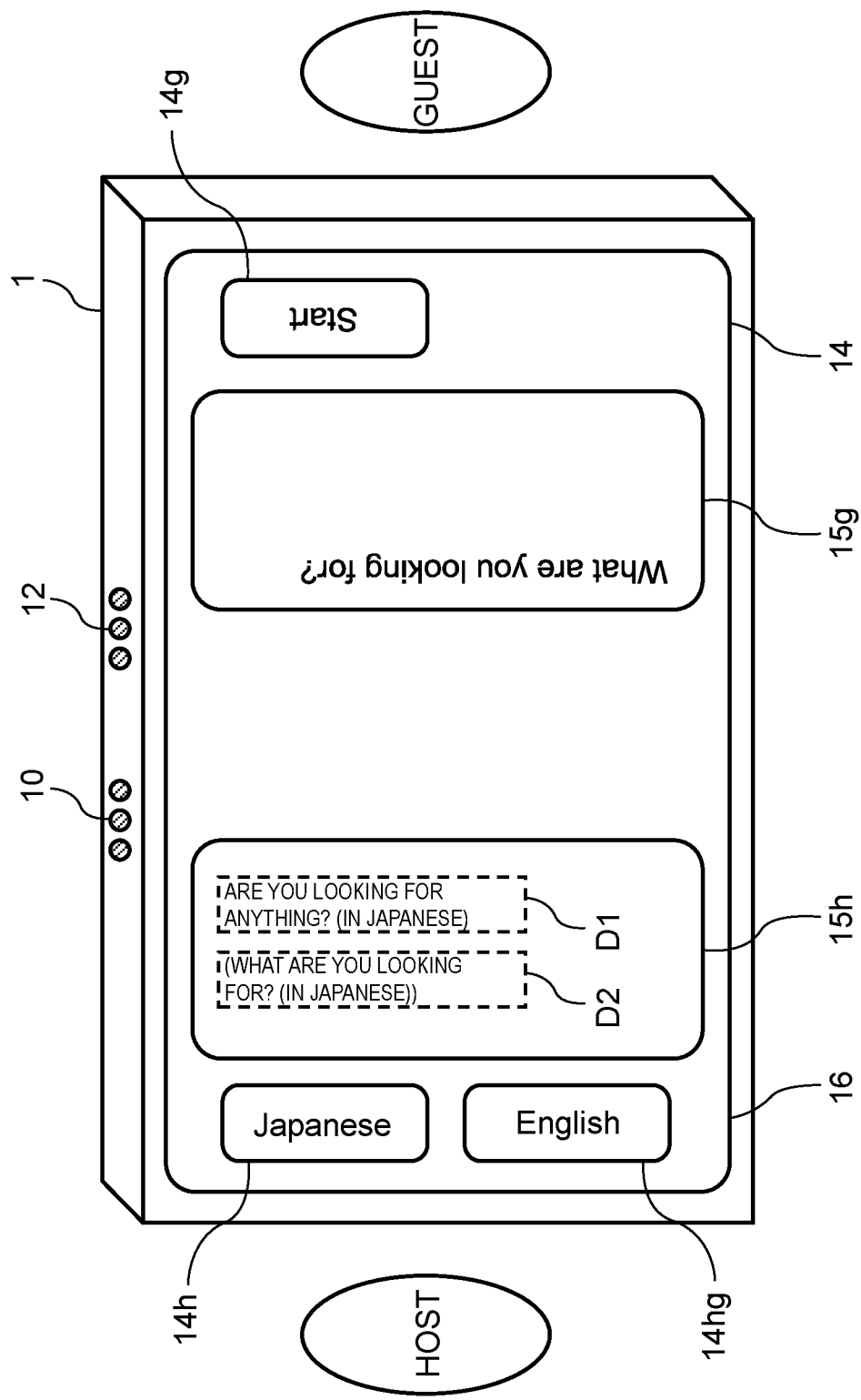
FIG. 13 is a view exemplifying display of a reverse translation result by a translation device according to a fourth exemplary embodiment.

Translation device 1 according to the present exemplary embodiment has a reverse translation function of translating, into an original language (e.g., Japanese), a translation result (sentence) obtained by translation of a language of utterance (e.g., Japanese) into another language (e.g., English). FIG. 13 exemplifies a reverse translation result presented along with a translation result on display 14. Display area 15$h$ adjacent to the host as the speaker presents sentence D1 according to a voice recognition result and sentence D2 according to a reverse translation result. Display area 15$g$ adjacent to the guest presents a translation result "What are you looking for?".

Translation device 1 according to the present exemplary embodiment evaluates the reverse translation result, and displays a message requesting reinput of utterance without outputting the translation result if the reverse translation result has low evaluation. Translation device 1 according to the present exemplary embodiment is similar in hardware configuration to the translation device according to the first exemplary embodiment.

Figure 14:
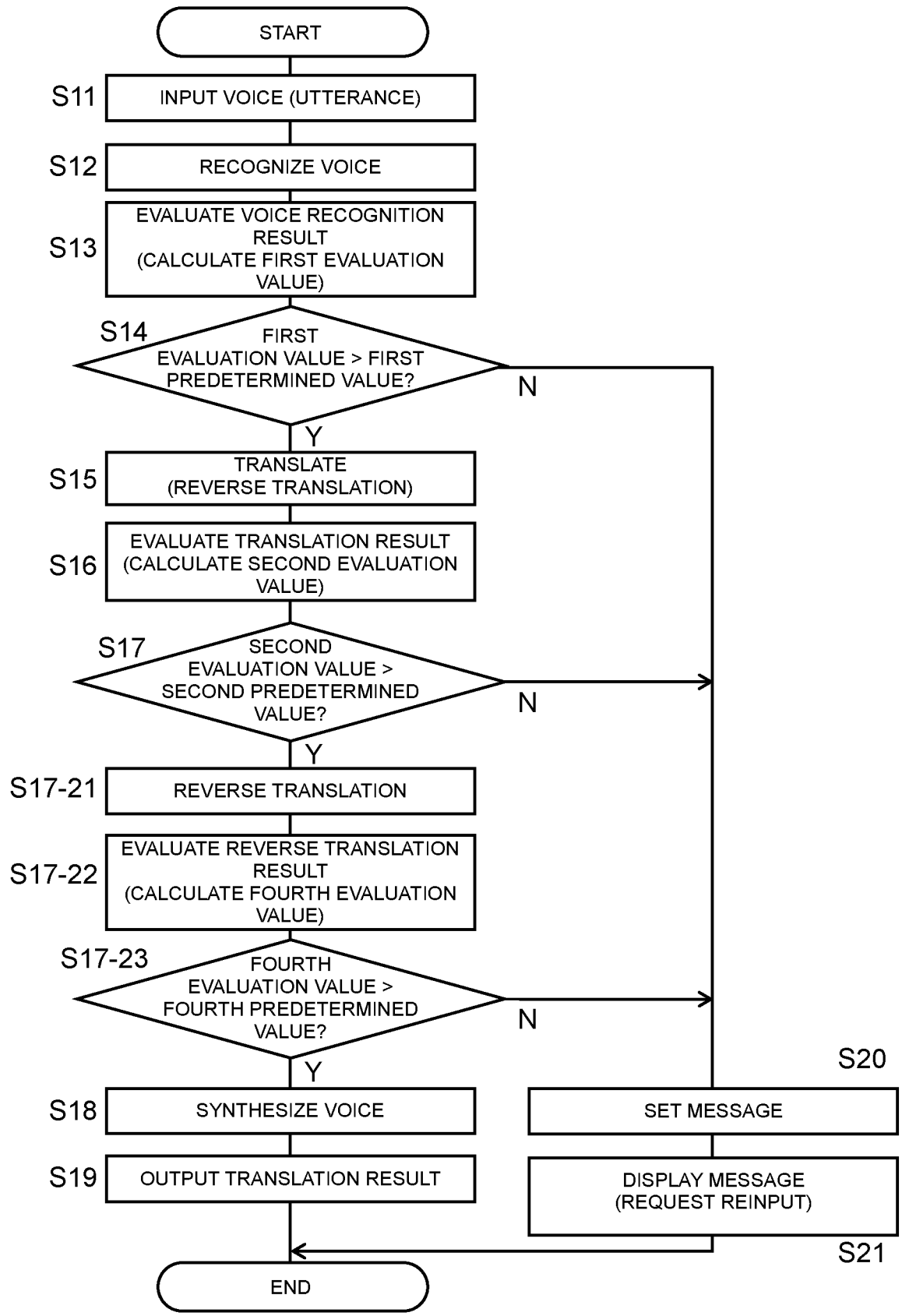
FIG. 14 is a flowchart of processing executed by a controller included in the translation device according to the fourth exemplary embodiment.

FIG. 14 is a flowchart of translation processing executed by translation device 1 according to the fourth exemplary embodiment. The flowchart in FIG. 14 includes, in addition to steps S11 to S21 included in the flowchart in FIG. 5 according to the first exemplary embodiment, steps S17-21 to S17-23.

Controller 22 of translation device 1 according to the present exemplary embodiment evaluates the translation result (S16) and then executes reverse translation of the translation result (S17-21). Controller 22 accordingly transmits data of the translation result to translation server 4. Translation server 4 executes reverse translation of text according the translation result thus received, and transmits, to translation device 1, reverse translation data indicating a reverse translation result.

Controller 22 having received the reverse translation data obtains an evaluation value for the reverse translation result (S17-22). Controller 22 accordingly transmits the voice recognition data and the reverse translation data to evaluation server 6. Evaluation server 6 calculates a fourth evaluation value for the reverse translation result from the voice recognition data and the reverse translation data. The fourth evaluation value for the reverse translation result is calculated in the following manner.

Specifically, the fourth evaluation value is calculated in accordance with sentence closeness (distance) between text according to data of the voice recognition result (hereinafter, referred to as "voice recognition text") and text according to data of the reverse translation result (hereinafter, referred to as "reverse translation text"). Such sentence closeness can exemplarily be calculated by vectorizing a sentence according to the voice recognition text as well as a sentence according to the reverse translation text (see Ryan Kiros, Yukun Zhu, Ruslan Salakhutdinov, Richard S. Zemel, Antonio Torralba, Raquel Urtasun, Sanja Fidler, "Skip-Thought Vecors", arXiv: 1506.06726, 2015. 103) and obtaining cosine similarity between these sentence vectors. The sentence closeness can alternatively be obtained in accordance with calculated similarity or distance between words configuring the sentences. Specifically, similarity or distance may be obtained for each combination of words between the two sentences, and the sentence closeness may be obtained as a geometrical mean of all similarity or distance values thus obtained. The fourth evaluation value is calculated in accordance with the sentence closeness thus obtained. There is set an expression for calculation of the fourth evaluation value such that the fourth evaluation value is higher as the sentences are closer, in other words, as the similarity is larger or the distance is shorter.

The sentence closeness can be evaluated in accordance with a method examples of which include BLEU, BLEU+, WER, TER, RIBES, NIST score, METEOR, ROUGE-L, and IMPACT (see Graham Neubig, "Investigation of sentence-level machine translation evaluation measure", Research report by Information Processing Society of Japan, 1, 2013; and Tsutomu Hirao, Hideki Isozaki, Kevin Duh, Katsuhito Sudo, Hajime Tsukada, and Masaaki Nagata, "RIBES: method of automatically evaluating translation according to rank correlation", collected papers presented at 17th annual meeting of the Association for Natural Language Processing, 1115, 2011). Furthermore, a method of evaluating sentence closeness in consideration of sentence contents can be exemplified by a neural network method with a single hidden layer, a recurrent neural network method, a convolutional neural network method, a recursive neural network method, or a feedforward neural network method (see Yuta Tsuboi, "Development in deep learning in natural language processing", Operations Research, 205, 2015). Vectorization of a word or a sentence also exemplifies the method of evaluating sentence closeness (see Tomas Mikolov, Kai Chen, Greg Corrado, Jeffrey Dean, "Efficient Estimation of Word Representations in Vector Space", arXiv: 1301.3781, 2013).

Evaluation server 6 transmits the fourth evaluation value thus calculated to translation device 1. Translation device 1 compares the fourth evaluation value thus received with a fourth predetermined value (S17-23).

In a case where the fourth evaluation value is more than the fourth predetermined value (YES in S17-23), controller 22 executes voice synthesis (S18), outputs voice according to the translation result from speaker unit 12, and presents text according to the translation result in display areas 15h, 15g of display 14 (S19).

In another case where the fourth evaluation value is less than or equal to the fourth predetermined value (NO in S17-23), controller 22 sets a message suggesting that translation may be inappropriate (S20). When the fourth evaluation value is less than or equal to the fourth predetermined value, the translation text is largely different in contents from the reverse translation text and the output translation result will be unlikely to be intended by the speaker. The message presented in the display area adjacent to the speaker can be set to include text "Please check whether or not your partner receives what you want to tell" as exemplified in FIG. 4. The message presented in the display area adjacent to the partner is set to ask for time. The message (fourth information) presented when the fourth evaluation value for the reverse translation result is low is different from the message presented when the evaluation value for the voice recognition result or the translation result is low, as depicted in FIG. 4. The contents of the message differ in accordance with the type of processing having low evaluation, to achieve presenting the speaker with an appropriate message according to a situation.

Figure 15:
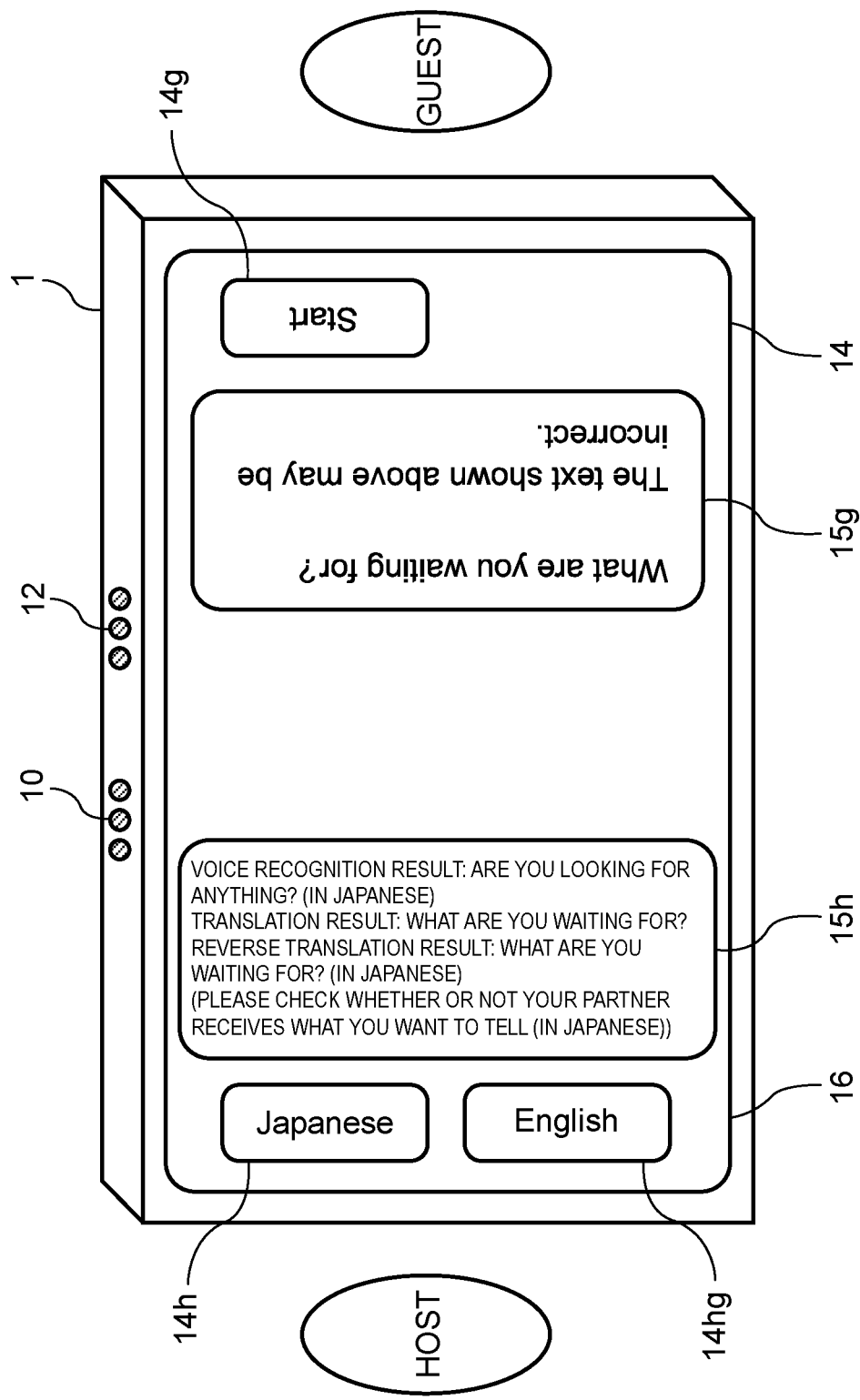
FIG. 15 is a view exemplifying an alert message displayed in a case where the translation device according to the fourth exemplary embodiment has a reverse translation result having a low evaluation value.

Controller 22 then presents the message thus set on display 14 (S21). FIG. 15 is a view exemplifying presentation in this case. As depicted in FIG. 15, display area 15h adjacent to the host presents text according to the voice recognition result, text according to the translation result "What are you waiting for?", as well as text according to the reverse translation result and text of a message checking whether or not reinput is necessary. Display area 15g adjacent to the guest presents text according to the translation result "What are you waiting for?" and a message indicating a risk of an incorrect translation result "The text shown above may be incorrect". The host as the speaker determines whether or not utterance needs to be reinput through checking the contents presented in display area 15h, and reinputs utterance if necessary. The host can recognize whether or not translation device 1 has correctly translated what the host wants to tell, and can select appropriate words to correctly input the contents of utterance.

As described above, the present exemplary embodiment further includes evaluating the reverse translation result and displaying a message requesting reinput if the reverse translation has low evaluation. This configuration prevents output of an inappropriate translation result.

The present exemplary embodiment includes addition of steps S17-21 to S17-23 to the steps in the flowchart in FIG. 5 according to the first exemplary embodiment. The present exemplary embodiment can alternatively include addition of steps S17-21 to S17-23 to the steps in the flowchart in FIG. 10 according to the third exemplary embodiment. In the latter case, processing in step S17-21 may be executed if YES in step S17-13.

Other Exemplary Embodiments

The first to fourth exemplary embodiments have been described above to exemplify the techniques disclosed in the present application. The techniques according to the present disclosure are not limited by these exemplary embodiments, and are applicable to other exemplary embodiments achieved through change, replacement, addition, elimination, or the like where appropriate. Furthermore, constituent elements according to the first to fourth exemplary embodiments can be combined to achieve a new exemplary embodiment. Such other exemplary embodiments will be described below.

The above exemplary embodiments include presenting a message requesting reinput on display 14 when voice recognition, translation, or reverse translation has a low evaluation value. Controller 22 can alternatively output voice requesting reinput from speaker unit 12, instead of presenting such a message requesting reinput on display 14. Speaker unit 12 exemplifies the notification unit configured differently. The messages depicted in FIG. 4 are merely exemplified and may each have different contents.

The above exemplary embodiments merely exemplify the methods of evaluating processing of voice recognition, translation, and reverse translation. These processing results can alternatively be evaluated in accordance with any different method. There may be adopted a method of evaluating whether or not a sentence obtained through each processing is appropriate in its language.

The above exemplary embodiments include calculating the first to fourth evaluation values such that the evaluation values each increase with a more preferred processing result (i.e., with higher evaluation). The present disclosure is not limited by these exemplary embodiments. The first to fourth evaluation values can alternatively be calculated such that the evaluation values each decrease with a more preferred processing result (i.e., with higher evaluation).

The above exemplary embodiments include evaluating "sentence perfection" in accordance with the N-gram model. The present disclosure is not limited by these exemplary embodiments. Such "sentence perfection" can alternatively be evaluated with reference to distributed representation (word vector) (see Tomas Mikolov, Kai Chen, Greg Corrado, Jeffrey Dean, "Efficient Estimation of Word Representations in Vector Space", arXiv: 1301.3781, 2013). It is possible to adopt in combination the neural network method with a single hidden layer, the recurrent neural network method, the convolutional neural network method, the recursive neural network method, or the feedforward neural network method (see Yuta Tsuboi, "Development in deep learning in natural language processing", Operations Research, 205, 2015). Vectorization of a word or a sentence also exemplifies the method of evaluating sentence closeness.

The second exemplary embodiment includes replacing a word having extremely low appearance probability in previous text. Words can alternatively be compared between the previous text and the current text to select the word having higher appearance probability.

In the above exemplary embodiments, voice recognition server 3 executes voice recognition, translation server 4 executes translation, and voice synthesis server 5 executes voice synthesis. The present disclosure is not limited to this configuration. Translation device 1 can alternatively execute at least one of voice recognition, translation, and voice synthesis. Furthermore, evaluation server 6 calculates the evaluation values. Translation device 1 can alternatively execute calculation of the evaluation values.

The above exemplary embodiments exemplify translation between Japanese and English. The present disclosure is not limited to Japanese and English as languages for translation, and may include any other language (e.g., Chinese, German, French, Spanish, Korean, Thai, Vietnamese, or Indonesian).

Controller 22 according to the first exemplary embodiment executes processing in step S20 if the first evaluation value is less than or equal to the first predetermined value in step S14 (see FIG. 5). Controller 22 can alternatively execute processing in step S15, regardless of the first evaluation value. If the second evaluation value is less than or equal to the second predetermined value in step S17, controller 22 may present, on display 14, that both voice recognition processing and translation processing are problematic.

Figure 16:
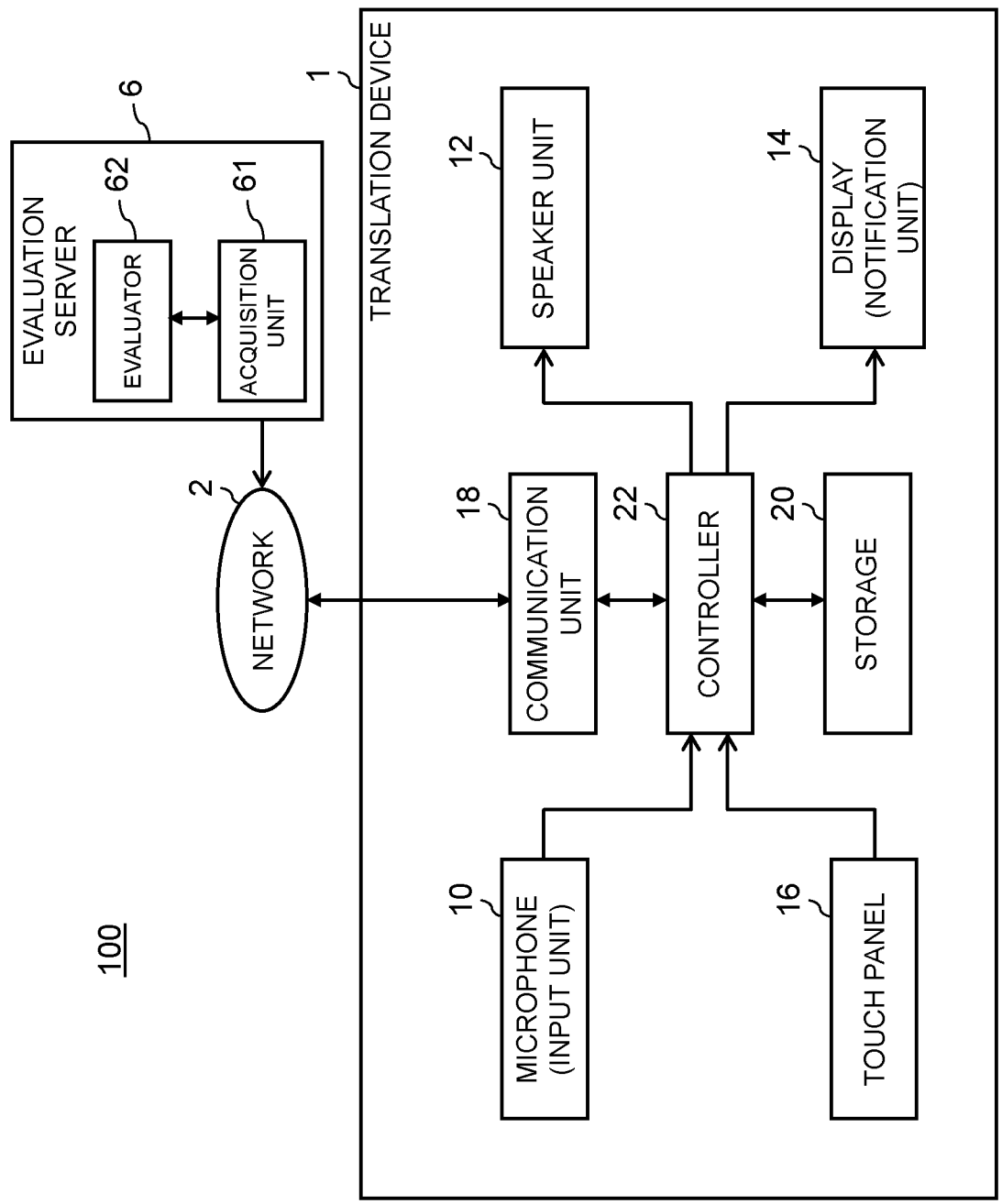
FIG. 16 is a block diagram depicting an electric configuration of a translation system according to a different exemplary embodiment.

Controller 22 according to the third exemplary embodiment generates the third evaluation value. The present disclosure is not limited to this configuration. The third evaluation value can alternatively be generated by evaluation server 6. Generation of the third evaluation value by evaluation server 6 will exemplarily be described with reference to FIG. 16. FIG. 16 depicts translation system 100 including translation device 1 and evaluation server 6 that includes acquisition unit 61 and evaluator 62. FIG. 16 does not depict voice recognition server 3, translation server 4, and voice synthesis server 5. Acquisition unit 61 acquires voice recognition data in Japanese and translation data in English from translation device 1. Evaluator 62 generates an evaluation value for identity between the voice recognition data and the translation data. Similarly to controller 22 according to the third exemplary embodiment, evaluator 62 converts the voice recognition data into distributed representation to generate the first distributed representation group. Evaluator 62 similarly converts the translation data into distributed representation to generate the second distributed representation group. Evaluator 62 then generates an evaluation value for identity between the first distributed representation group and the second distributed representation group. As described above, evaluation server 6 may generate the third evaluation value and transmit the third evaluation value to controller 22 of translation device 1 via network 2. This simplifies the configuration of translation device 1 functioning as a terminal device.

The exemplary embodiments have been described to exemplify the techniques according to the present disclosure. The accompanying drawings and the detailed description are provided for this purpose.

The constituent elements appearing in the accompanying drawings or the detailed description may accordingly include constituent elements essential for achievement of the object as well as constituent elements inessential for achievement of the object. Such inessential constituent elements should not be recognized as being essential simply because these constituent elements appear in the accompanying drawings or the detailed description.

The above exemplary embodiments are provided to exemplify the techniques according to the present disclosure, and can thus have modification, replacement, addition, removal, and the like in various manners within the scope of the claims or equivalents of the claims.

INDUSTRIAL APPLICABILITY

The present disclosure is applicable to a translation device configured to execute translation according to voice of a speaker.

REFERENCE MARKS IN THE DRAWINGS

1: translation device
2: network
3: voice recognition server
4: translation server
5: voice synthesis server
6: evaluation server
10: microphone (input unit)
12: speaker unit
14: display (notification unit)
16: touch panel
18: communication unit
20: storage
22: controller
14$h$, 14$g$, 14$hg$: utterance icon
15$h$, 15$g$: display area
100: translation system

The invention claimed is:

1. A translation device configured to acquire an utterance spoken by a speaker in a first language and translate contents of the utterance into a second language for information presentation, the translation device comprising:
    an input unit configured to acquire the utterance in the first language and generate voice data from the utterance;
    a controller configured to acquire a second evaluation value for translation data obtained through translation processing of voice recognition data into the second language, the voice recognition data being obtained through voice recognition processing of the voice data;
    a notification unit configured to present the speaker with information on an utterance reinput request; and
    a storage configured to store the translation data as past translation data, wherein:
    the controller is configured to determine whether or not the second evaluation value is less than or equal to a second predetermined value,
    in response to the determination that the second evaluation value is less than or equal to the second predetermined value, the controller is configured to determine whether or not the utterance corresponds to the information on the utterance reinput request,
    in response to the determination that the utterance does not correspond to the information on the utterance reinput request, the notification unit is configured to present second information on the utterance reinput request,
    the input unit is configured to acquire a reinput utterance in the first language and generates reinput voice data from the reinput utterance,
    the controller is configured to acquire a reinput second evaluation value for reinput translation data obtained through translation processing of reinput voice recognition data into the second language, the reinput voice recognition data being obtained through voice recognition processing of the reinput voice data, and
    the controller is configured to generate new translation data with reference to the past translation data and the reinput translation data, when the reinput second evaluation value is less than or equal to the second predetermined value.

2. The translation device according to claim 1, wherein the controller is configured to acquire a third evaluation value for an identity between the voice recognition data and the translation data, and
    the notification unit is configured to present third information on the utterance reinput request different from the second information when the third evaluation value is less than or equal to a third predetermined value.

3. The translation device according to claim 2, wherein the third evaluation value is generated in accordance with an identity between a first distributed representation group obtained by converting the voice recognition data into a distributed representation and a second distributed representation group obtained by converting the translation data into a distributed representation.

4. The translation device according to claim 3, wherein
the first distributed representation group is generated in accordance with a first conversion table for conversion of a word in the first language into a distributed representation,
the second distributed representation group is generated in accordance with a second conversion table for conversion of a word in the second language into a distributed representation, and
the first conversion table and the second conversion table are generated from a single parallel translation table.

5. The translation device according to claim 2, wherein the third evaluation value is generated by the controller.

6. The translation device according to claim 2, further comprising a communication unit, wherein:
the communication unit is configured to communicate with an evaluation server,
the third evaluation value is generated by the evaluation server, and
the controller is configured to acquire the third evaluation value from the evaluation server via the communication unit.

7. A translation system comprising:
the translation device according to claim 6; and
the evaluation server.

8. The translation device according to claim 1, wherein the second evaluation value is calculated in accordance with an appearance probability of a word included in the translation data.

9. The translation device according to claim 1, wherein:
the controller is configured to acquire a fourth evaluation value for reverse translation data obtained through reverse translation of the translation data into the first language, and
the notification unit is configured to present fourth information on the utterance reinput request different from the second information when the fourth evaluation value is less than or equal to a fourth predetermined value.

10. The translation device according to claim 1, wherein the controller is configured to generate the new translation data through selection of a word having higher appearance probability between the past translation data and the translation data of the reinput utterance.

11. The translation device according to claim 1, wherein the controller is configured to generate the new translation data through replacement of a word having appearance probability lower than a predetermined value among words configuring the past translation data with a word configuring the translation data of the reinput utterance.

12. The translation device according to claim 1, wherein the controller is configured to delete the past translation data from the storage when the new translation data has an evaluation value exceeding a predetermined value.

13. The translation device according to claim 1, wherein:
the storage is further configured to store the voice recognition data as past voice recognition data,
the controller is configured to acquire a first evaluation value for the reinput voice recognition data, and
the controller is configured to generate new voice recognition data with reference to the past voice recognition data and the reinput voice recognition data, when the first evaluation value is less than or equal to a first predetermined value.

14. The translation device according to claim 13, wherein the reinput translation data is obtained through translation processing of the new voice recognition data into the second language.

* * * * *